United States Patent [19]

Brennan

[11] Patent Number: 5,070,966

[45] Date of Patent: Dec. 10, 1991

[54] COVER AND DISPLAY DEVICE FOR COUNTERTOP SCANNER

[75] Inventor: William M. Brennan, Milwaukee, Wis.

[73] Assignee: Serigraph Inc., West Bend, Wis.

[21] Appl. No.: 272,516

[22] Filed: Nov. 17, 1988

[51] Int. Cl.$^5$ ................................................. A47F 9/4
[52] U.S. Cl. ..................................... 186/61; D14/116
[58] Field of Search ......................... 186/39, 56, 59, 61,
186/68; 235/383, 462, 466, 467; 364/405;
D14/116, 115

[56] References Cited

U.S. PATENT DOCUMENTS

| | | | |
|---|---|---|---|
| 4,093,865 | 6/1978 | Nickl | 235/470 X |
| 4,713,532 | 12/1987 | Knowles | 235/467 |
| 4,766,298 | 8/1988 | Meyers | 235/462 |
| 4,794,240 | 12/1988 | Schorr et al. | 235/462 X |
| 4,799,164 | 1/1989 | Hellekson et al. | 235/467 |

Primary Examiner—F. J. Bartuska
Attorney, Agent, or Firm—Andrus, Sceales, Starke & Sawall

[57] ABSTRACT

A protective cover and display device for a checkout countertop having a code scanner includes a sheet of material adapted to cover the scanner opening and adjacent portions of the countertop. The sheet includes a transparent window in the portion overlying the scanner opening and visually perceptible indicia, such as advertising copy, on the portion of the sheet surrounding the opening. In addition to providing advertising which is highly visible and disposed in a high traffic area, the sheet covers and protects the scanner opening which is typically a repository for the accumulation of dirt, food particles, and other foreign materials.

18 Claims, 1 Drawing Sheet

COVER AND DISPLAY DEVICE FOR COUNTERTOP SCANNER

BACKGROUND OF THE INVENTION

The present invention relates to a protective cover and display device for use on a countertop which includes an opening for the transmission of a signal from a code scanning apparatus located beneath the countertop. More particularly, the invention relates to the use of a thin sheet of material which may be affixed to the counter over the opening, which sheet includes a transparent window overlying the opening and printed advertising or other information on portions of the sheet surrounding the opening.

The automatic scanning and reading of coded products sold at retail has grown rapidly. Typically, a conventional bar code on a product package is scanned by a high intensity light beam, such as a laser beam, and the code information reflected back and processed to output information such as price, product type and quantity. Bar code scanners are typically built into the countertop of a checkout counter enabling the clerk to pass the coded product over an opening in the countertop through which the scanner beam is caused to be projected from below. The laser beam is typically caused to move in a multi-direction pattern so that bar codes may be read even though disposed at an acute angle with respect to the countertop.

Most scanners in use today are enclosed in a protective glass or other transparent cover over which is placed a frame having a slotted pattern representative of the multi-directional lines along which the scanning beam is projected through the glass cover from below. The frame which defines the slotted opening may be mounted flush with the countertop or may extend slightly above the plane of the countertop. The glass cover usually lies immediately under the frame.

When such scanning devices are used in retail outlets, such as food stores and supermarkets, dirt, food particles, and scraps of packaging materials collect in the cracks or joints between the frame and the glass and/or between the frame and the countertop. The resulting accumulation is not only unsightly, but may also be unsanitary and even result in an obstruction to passage of the scanning beam. Keeping the joints or cracks between these countertop components free from dirt, particles and scraps of various kinds requires periodic cleaning which is cumbersome and tedious because of the construction and arrangement of the components.

A typical countertop which may be made, for example, from a stainless steel sheet must be wide enough to accommodate the larger products which are to be processed over the countertop. The scanner opening on the other hand, generally covers a smaller area of that portion of the countertop, although the surrounding frame may vary substantially in area. The area of the countertop immediately surrounding the scanner opening is exposed to and readily visible by a continuous sequence of customers throughout the business day. It is, of course, well known to strategically place certain products, advertising and other information at or in close proximity to a checkout counter where customers are waiting to be served. The countertop itself, particularly the area surrounding the scanner opening, provides another area where advertising or other informative or instructional information could be placed for viewing by customers. However, any such advertising or other information would have to be capable of being affixed to the countertop in a stable manner which would not interfere with the movement of products over the counter or with the operation of the scanner. In addition, the advertising or other information would preferably have to be affixed in a non-permanent manner and capable of being readily removed and/or replaced.

SUMMARY OF THE INVENTION

The present invention resolves the problem of accumulation of dirt and other foreign materials in and around the scanner opening in a countertop and simultaneously provides a means for utilizing the flat open area surrounding the scanner opening for the display of advertising or other information. The invention is directed to a unitary protective cover and display device which comprises a sheet of material which covers the scanner opening and adjacent portions of the countertop surrounding the opening. The sheet includes a transparent window in the portion overlying the opening and all or a part of the sheet adjacent the opening contains visually perceptible indicia, such as advertising or other instructional or informative data, positioned to be readily apparent to customers at the counter.

In its preferred embodiment, the sheet comprises a thin flexible plastic material adapted to lie in contact with the countertop and to be secured against displacement relative thereto. The underside of the sheet may be provided with a non-skid surface which is effective in preventing a plastic sheet from sliding on a smooth stainless steel countertop or the plastic frame surrounding the scanner opening, yet is readily removable. Alternately, the sheet may be provided with a low tack adhesive.

The transparent window, which would optimally be located in approximately the center of the sheet, preferably conforms to the shape of the scanner opening or the frame which typically defines the opening. Indicia which is visually perceptable by the customer may be printed or otherwise affixed to any portion of the sheet which surrounds the opening or positioned such that it will not obscure or block the scanner opening. By printing or affixing the indicia to the backside or bottom of an initially transparent plastic sheet, the indicia is protected against scratching or marring by virtue of products sliding over it or the like.

In those countertop installations where the scanner opening frame projects above the top surface of the main countertop, the covering sheet of plastic material may be embossed to conform to the shape of the opening or the frame to maintain a substantially smooth surface. The window in the center of the sheet may be provided alternately by cutting out a portion of the sheet defining the opening or the frame.

DETAILED DESCRIPTION OF THE PREFERRED EMBODIMENT

Figure 1:
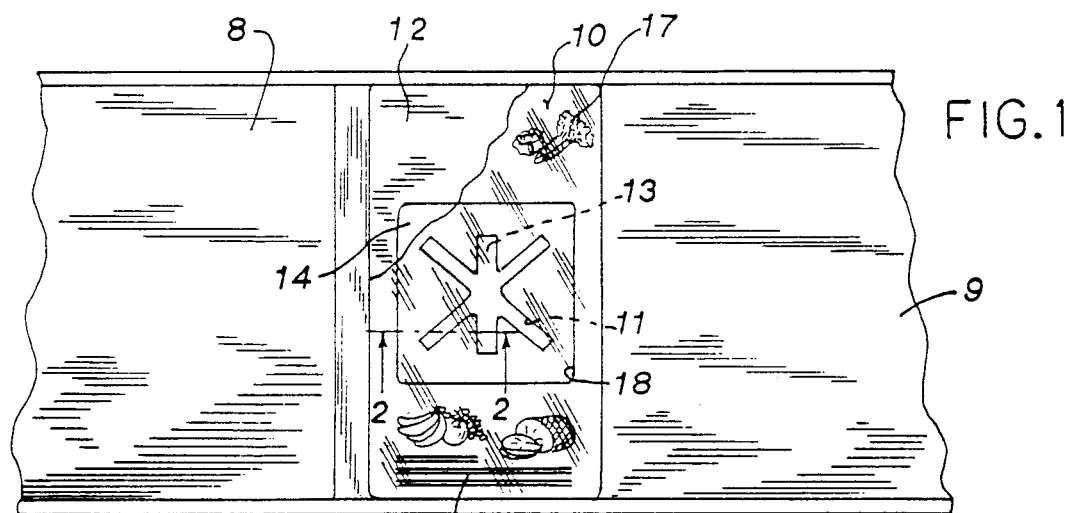
FIG. 1 is a top plan view of a portion of a countertop including a scanner opening over which the protective cover and display device of the present invention is placed.
Figure 2:
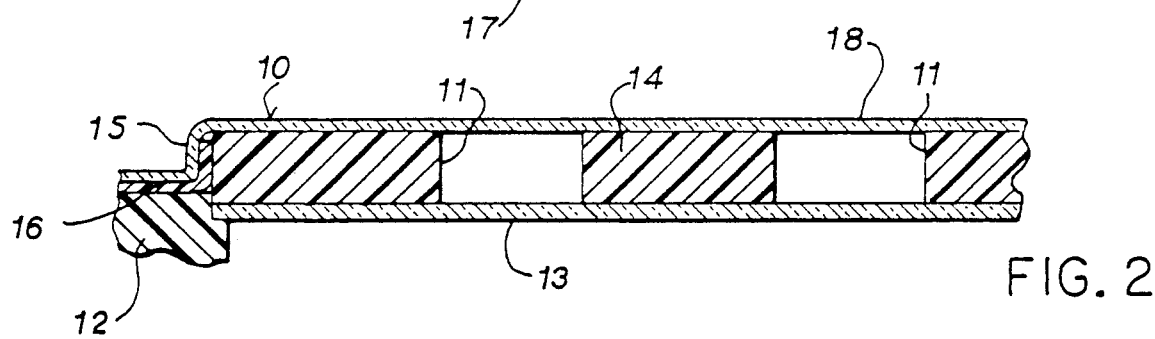
FIG. 2 is an enlarged vertical section taken on line 2—2 of FIG. 1.

Referring particularly to FIGS. 1 and 2, a sheet 10 of thin flexible plastic material, such as polyester, is sized to overlie a scanner opening 11 in a countertop 12 and to also cover adjacent portions of the countertop itself. The scanner opening 11, through which a high intensity light beam, such as a laser beam, is projected from below the countertop, is covered by a sheet of glass 13 and defined by a frame 14 overlying the glass sheet. The irregular shape of the opening 11 accommodates the multi-directional pattern in which the laser beam is projected from below. The pattern shown is merely one example of a pattern in present use.

A typical checkout counter incorporating a scanner may include a conveyor belt 8 for carrying coded products placed thereon by a customer to a clerk standing across the counter near the scanner. After scanning, the products are placed on an outlet surface 9 which may comprise another conveyor belt or a smooth stationary surface.

As may be seen particularly in FIG. 2, the frame 14 projects slightly above the surface of the countertop 12 and also above the surface of the glass sheet 13 enclosing the opening 11. The flexible sheet 10 of the present invention is placed to overlie the entire scanner opening 11 and the frame 14 and to also overlie all or a portion of the countertop 12 surrounding the frame and opening. The frame 14 is typically constructed of a tough plastic and the surrounding countertop may also be plastic or a stainless steel sheet. The inherent flexibility of the sheet 10 of plastic material may be utilized to accommodate the stepped rise from the surface of the countertop 12 to the surface of the frame 14. However, since the stepped rise must be typically accommodated on four sides of the frame, resulting possibly in some distortion of a planar sheet, the sheet may alternately be embossed to provide a stepped deformation 15 which conforms to the outline of the peripheral edge of the frame 14. In either case, with the flexible sheet 10 in place, the cracks, joints and corners at the junctures of the countertop 12 and frame 14 and the frame and the glass sheet 13 are covered by a relatively smooth continuous layer, thereby precluding the accumulation of dirt and other foreign matter.

The sheet 10 of polyester, or other material such as vinyl or polycarbonate, is initially transparent such that the portion overlying the scanner opening 11 allows unobstructed passage of the scanner beam therethrough. The portion of the sheet 10 surrounding the opening, and preferably that portion outside the peripheral edge of the frame 14 may be provided with a layer 16 of a visually perceptable indicia 17 which is readily visible to a customer or patron at or near the countertop. In the embodiment shown in FIGS. 1 and 2, the indicia layer 16 covers all or a portion of the sheet material directly in contact with the countertop 12 and outside a transparent window 18 defined generally by the embossed edge of the stepped deformation 17.

In an alternate embodiment, the window 18 may be provided by removing, as for example by die cutting, the interior portion of the sheet which would otherwise overlie the scanner opening 11. Preferably, such an open window would conform to the outer peripheral edge of the frame 14. This embodiment obviates the need for a stepped deformation 15 in the sheet, but would sacrifice a portion of the protective covering.

Figure 3:
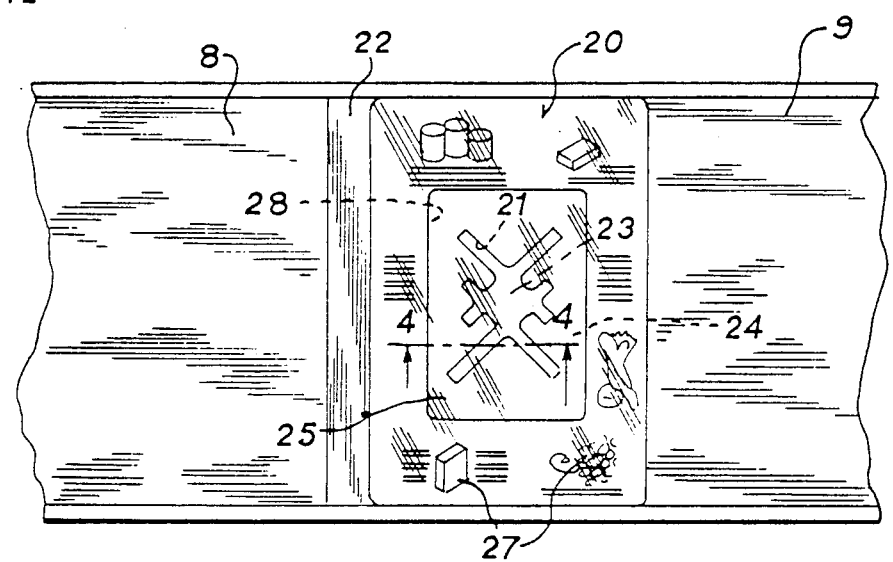
FIG. 3 is a top plan view, similar to FIG. 1, showing another configuration of a scanner opening and frame in a countertop.
Figure 4:
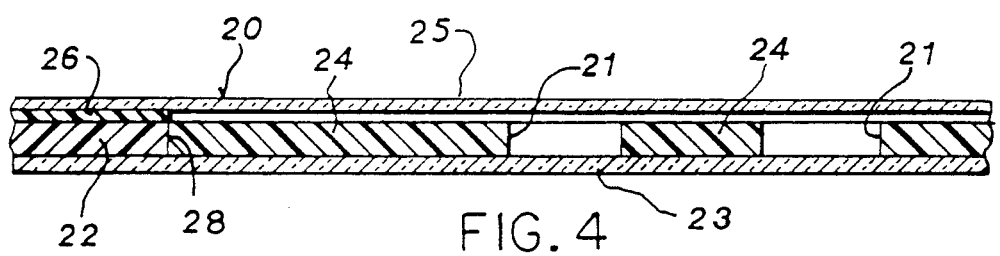
FIG. 4 is an enlarged vertical section taken on line 4—4 of FIG. 3.

In FIGS. 3 and 4, there is shown a countertop with a scanner opening 21 of a slightly different configuration. The sheet 20 providing the protective cover and display may be identical to the sheet 10 of the previously described embodiment, except the sheet 20 does not require an embossed portion 15. The frame 24 defining the scanner opening 21 and overlying the conventional glass sheet 23 is recessed in an opening 28 in the countertop 22 such that the upper surfaces of the countertop and frame are coplanar. Thus, the sheet 20 which is placed over the countertop and frame lies flat and covers the recesses formed by the inside edges of the frame defining the scanner opening 21. With the protective cover 20 in place, a smooth continuous upper surface is provided for the entire countertop, including scanner opening and frame.

The sheet 20 of the FIGS. 3 and 4 embodiment may be provided with a visual indicia 27 in a manner similar to the sheet 10 of the previously described embodiment. The indicia may typically cover any or all of the portion of the sheet 20 which is disposed outside of the opening 28 in the countertop when the sheet is in place, leaving a window 25 for the transmission of scanner signals. However, the layer 26 of indicia 27 may also cover the upper surface portion of the frame 24 so long as the scanner opening 21 is left unobstructed. In other words, the open or transparent window in the sheet 20 must minimally conform to the size and shape of the scanner opening 21.

As indicated previously, the sheets 10 or 20 are preferably made of polyesters and material with a thickness of 5 mils may typically be used. Sheet material of this thickness has adequate strength to resist tearing, puncture or other damage, yet is flexible enough to provide easy handleability and to accommodate minor surface irregularities. When the visual indicia 17 or 27 is printed on the backside of the sheet, it is inherently protected from scratching or other damage. The printing may be provided by lithographic, screening, or other printing processes. Finally, the underside of the sheet may be provided with a non-skid surface which virtually prevents any sliding movement between the sheet and the countertop and also provides some resistance against lifting and peeling of the sheet. Alternately, the underside of the sheet may be provided with a low-tack adhesive to provide greater resistance to lifting and peeling of the edges.

In lieu of providing an embossed sheet to conform to the edges of a raised frame 14, as described in the embodiment of FIGS. 1 and 2, the sheet may be made of a heat shrinkable plastic which would conform to the irregular top surface of the counter.

The protective cover and display device of the present invention simultaneously solves the problem of accumulation of dirt and other foreign material in and around the scanner opening, provides a significant area of high visibility and high traffic for advertising, provides an addition protective layer for the countertop and scanner opening, and provides a smooth transitional surface for products moved over the countertop. The sheet may be made at relatively low cost, thereby allowing the sheet and advertising copy printed thereon to be changed at short intervals.

I claim:

1. A removable cover and display device for a rigid countertop for a checkout counter having an opening for the transmission of signals from a code scanning apparatus, said device comprising:

a thin sheet of flexible material adapted to cover a portion of the countertop surrounding the opening;

window means in the interior of the sheet for the transmission of scanning signals therethrough; and, visually perceptible customer-oriented indicia on the portion of the sheet surrounding the opening.

2. The invention as set forth in claim 1 wherein said window means comprises an integral portion of the sheet overlying the opening and transparent to the scanning signals.

3. The invention as set forth in claim 1 wherein said window means comprises an open interior portion in the sheet surrounding the opening.

4. A removable protective cover and display device for a rigid countertop for a checkout counter having an opening for the transmission of signals from a code scanning apparatus, said device comprising:

a thin sheet of flexible material covering the opening and portions of the countertop adjacent the opening;

a transparent window in the portion of the sheet overlying the opening; and, visually perceptible customer-oriented indicia on the portion of the sheet adjacent the opening.

5. The invention as set forth in claim 4 wherein the sheet is adapted to lie in contact with the countertop.

6. The invention as set forth in claim 5 including means for securing the sheet against displacement relative to the countertop.

7. The invention as set forth in claim 6 wherein said securing means comprises an adhesive on one surface of the sheet.

8. The invention as set forth in claim 6 wherein said securing means comprises a non-skid surface on the sheet.

9. The invention as set forth in claim 4 wherein the sheet is adapted to cover a contiguous portion of the countertop surrounding the opening.

10. The invention as set forth in claim 4 wherein the transparent window conforms substantially to the shape of the opening.

11. The invention as set forth in claim 4 wherein said visually perceptible indicia comprises an advertising medium.

12. The invention as set forth in claim 11 wherein said medium is printed on the sheet material.

13. The invention as set forth in claim 4 wherein the sheet comprises a flexible plastic material.

14. The invention as set forth in claim 13 wherein the plastic material comprises a polyester.

15. The invention as set forth in claim 4 wherein the opening is enclosed by a frame projecting above the surface of the countertop and wherein the portion of the sheet overlying the opening is embossed to conform to the shape of the frame.

16. A disposable protective cover and display device for use with a rigid countertop for articles placed thereon by a customer having an opening for the transmission of signals from a scanning apparatus, said cover and display device comprising:

a thin sheet of flexible plastic material adapted to cover the opening and portions of the countertop surrounding the opening;

a window in the portion of the sheet overlying the opening, said window being transparent to the transmission of scanning signals; and customer information printed on the portion of the sheet surrounding the opening.

17. The invention as set forth in claim 16 including means for temporarily securing the sheet to the countertop.

18. The invention as set forth in claim 17 wherein the countertop comprises a part of a checkout counter for a retail sales facility and said printed information is advertising information.

* * * * *